# United States Patent Office 2,823,057
Patented Feb. 11, 1958

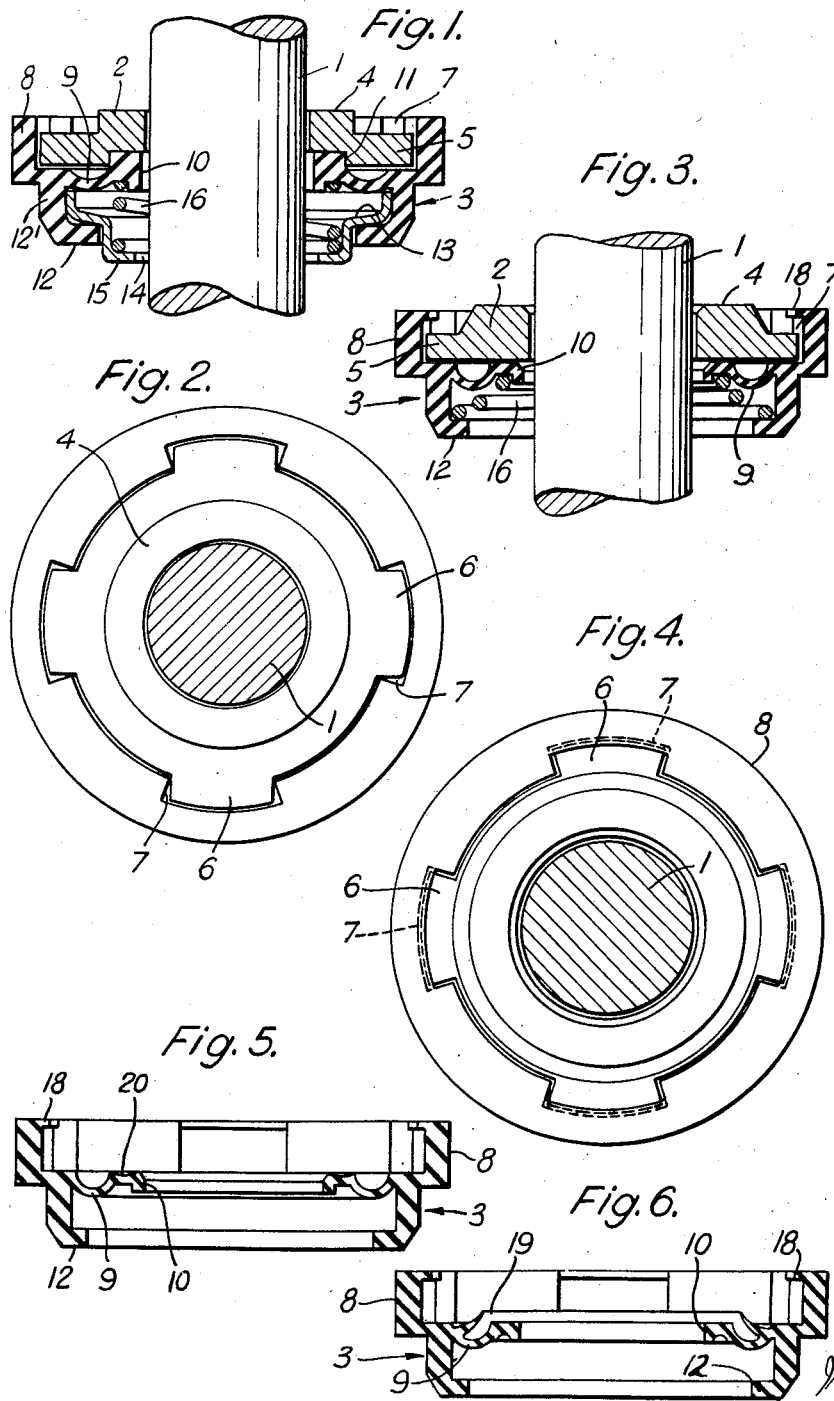

2,823,057

SEALING DEVICE FOR RELATIVELY ROTATABLE PARTS

George Mure Slight, London, England, and Reginald John Perry, Long Island City, N. Y., assignors to The Morgan Crucible Company Limited, London, England, a company of Great Britain Application April 27, 1954, Serial No. 426,016

Claims priority, application Great Britain May 1, 1953

14 Claims. (Cl. 288—3)

This invention is an improved sealing device for making a fluid tight seal between relatively rotatable coaxial parts, such as a shaft and a housing, of the type comprising a sealing ring with a front face to bear against a counterface on one part and a sealing ring cup-like holder carried by the other part. Such sealing device is useful for maintaining a differential fluid pressure in pumps and other machines, especially in the case where a shaft emerges from its bearings in a surrounding housing.

The object of the invention is to provide a sealing device of the aforementioned type which is relatively simple and inexpensive to manufacture and which can be readily fitted into position as a unit.

The improved sealing device according to the invention is characterised in that the sealing ring cup-like holder is a body of resiliently deformable material such as rubber having a portion surrounding the periphery of the sealing ring and interlocking therewith, to prevent relative rotation whilst permitting relative coaxial movement, by a key and slot engagement, and having at an intermediate point along its length an inwardly extending diaphragm portion, preferably formed integrally with the rubber cup-like holder, said diaphragm portion comprising a web, out of contact with the sealing ring, terminating in an inner ring which is in sealing relationship with the rear face of the sealing ring.

The holder has a rear portion which is preferably formed with an inwardly directed flange providing a seat for one end of a compression spring, the other end of which will bear against the rear surface of the diaphragm. The latter may have a thick rim to bear on the rear face of the sealing ring and may have a relatively thin arched web portion between such rim and the body of the holder. To enhance the sealing relationship between the rim of the diaphragm and the rear surface of the sealing ring, in the case when an adhesive bond and/or interlock is not employed, said rim may be recessed whereby a "sucker" effect is produced when it is pressed against the ring surface.

A cup of metal or other comparatively rigid material, having an opening in the bottom part thereof, may be snugly accommodated in the rear portion of the holder. The cup of metal or the like is preferably made to give an interference fit to the holder when the latter is fitted into a recessed member, e. g. a pump housing, thus providing a sure drive for torque transmission from that member to the holder and thence to the sealing ring.

The invention is illustrated by way of example in the accompanying drawings which show the sealing device surrounding a shaft, omitting the shaft housing and the counterface on which the sealing ring bears, such omitted parts being of well known construction and arrangement not requiring illustration.

In the drawings:

Figure 1 is a longitudinal cross-section of one form of sealing device;

Figure 2 is a plan view of Figure 1;

Figure 3 is a longitudinal cross-section of another form of sealing device;

Figure 4 is a plan view of Figure 3;

Figure 5 shows in longitudinal cross-section a modified form of sealing ring holder; and Figure 6 shows in longitudinal cross-section a further modification of sealing ring holder.

Referring to Figures 1 and 2 of the drawings, the shaft 1 is surrounded by a sealing ring 2, preferably made of carbon, in a moulded rubber holder generally indicated at 3. The bearing portion 4 of the sealing ring is thick compared with its peripheral portion 5.

In order to prevent relative rotation between the sealing ring and the holder, or, in other words, so as to provide a driving connection between these two parts, the periphery of the sealing ring is formed with equi-angularly spaced segmental projections 6 which constitute keys entering into corresponding slots 7 in a flange 8 of the holder which surrounds the sealing ring, the projections 6 and the slots 7 thus having generally radially overlapping surfaces extending generally in the direction of extent of the axis of the ring 2. In the axial direction, the length of the slots 7 is greater than the thickness of the projections 6. This permits of relative coaxial movement between the holder and the sealing ring.

The holder is formed with an inwardly extending diaphragm, the relatively thin web of which is indicated at 9 and the relatively thick inner rim of which is indicated at 10. The inner rim 10 projects into a counter-sunk recess 11 in the rear face of the sealing ring 2. At this place the rim 10 of the diaphragm and the sealing ring may be adhesively bonded together.

The rear portion of the holder 3 is formed with an inwardly directed flange 12, thus producing a recess in this part of the holder, and in this recess there is snugly accommodated a metal cup 13, having an opening 14 in the bottom part 15 thereof to allow the shaft 1 to go through it. A cylindrical compression spring 16 is mounted in the metal cup 13 with one end seating on the bottom part 15 and the other end bearing on the rear of the rim 10 of the diaphragm portion of the holder. This rear portion of the rim is cupped or recessed to receive the end of the spring 16.

It will be noted that the outer diameter of the rear portion 12' of the holder 3 is formed with a slight taper in the rearward direction. This taper facilitates fitting the holder in a cylindrical recess in a housing whilst securing a firm grip therein.

Referring to Figures 3 and 4, in which the same reference numerals used in Figures 1 and 2 designate corresponding parts, it will be noted that in this modification no metal cup is employed and that a tapering spring 16 is accommodated in a recess in the rear portion of the holder 3. The small diameter coil of the spring is received in a recess at the rear of the rim 10 of the diaphragm whilst the large diameter coil seats on the inwardly directed flange 12 in the corner of the recess in the holder. The spring is mounted so that the large diameter coil is under radial compression whereby an outward force is exerted upon the wall of the holder to ensure a tight frictional grip in the housing in which the holder will be mounted.

In Figures 3 and 4 the rim 10 of the diaphragm may simply bear with pressure against the rear surface of the sealing ring or it may be adhesively bonded thereto. In the case where there is no adhesive bond the front surface of the rim 10 of the diaphragm may be recessed, as shown at 20 in Figure 5, whereby a "sucker" effect is produced. It will be noted that the holder 3, as shown in Figures 3 to 5, is formed with a front wall 18 overlapping the sealing ring 2 and serving to retain the ring in the holder for assembly of the device as a unit. Such front wall is unnecessary in the case where there is an adhesive bond between the diaphragm and the sealing ring.

In Figure 6 a further slight modification of the form of the diaphragm of the holder is shown. In this case the web 9 of the diaphragm is branched to form an annular lip 19. This lip is splayed at a small angle to the radius of the diaphragm so as to be resiliently biased towards the sealing ring. In use, the lip will be compressed back into the radial plane of the front surface of the rim 10 and this will serve to enhance the sealing relationship between the diaphragm and the sealing ring.

We claim:

1. A sealing device for relatively rotatable coaxial parts comprising a sealing ring having a front face to bear against a counterface on one of said parts, and a cup-like holder for said sealing ring adapted to be carried by the other of said parts, said holder being made of resiliently deformable material and having a portion surrounding the periphery of said sealing ring, said portion and said sealing ring having generally radially overlapping faces extending generally in the direction of extent of the axis of said ring to prevent relative rotation of said portion and said ring whilst permitting relative coaxial movement, and said holder having at an intermediate point along its length a radially inwardly extending diaphragm portion comprising a web, out of contact with the sealing ring, terminating in an inner rim which is in sealing relationship with the rear face of said sealing ring.

2. A sealing device according to claim 1 wherein said sealing ring is formed on its periphery with angularly spaced segmental projections and wherein said portion of said holder surrounding the periphery of said sealing ring is formed with corresponding segmental recesses to receive said projections, thus providing said overlapping faces.

3. A sealing device according to claim 2, wherein, in the axial direction, the length of said recesses is greater than the thickness of said projection.

4. A sealing device according to claim 1 wherein said inner rim of said diaphragm portion of said holder is bonded to the rear face of said sealing ring.

5. A sealing device according to claim 1 wherein said first named portion of said holder surrounding the periphery of said sealing ring is channeled to accommodate and retain said sealing ring.

6. A sealing device according to claim 1 wherein the rear face of said sealing ring is formed with a recess and wherein said inner rim on said diaphragm portion engages in said recess.

7. A sealing device according to claim 1 wherein said inner rim of said diaphragm portion of said holder bears with sealing contact against the rear face of said sealing ring and, to provide additional sealing contact, is formed with an annular lip splayed towards the rear face of said sealing ring.

8. A sealing device according to claim 1 wherein the rear portion of said holder is formed with an inwardly directed flange to provide a recess and wherein a compression spring is mounted in said recess with one end seating on said flange and the other end bearing on the rear of said inner rim of said diaphragm portion of said holder.

9. A sealing device according to claim 8 wherein said compression spring has a tapering coil formation, the coil of larger diameter being at the rear and seating on said flange.

10. A sealing device according to claim 8 wherein said compression spring has a tapering coil formation, the coil of larger diameter being at the rear and seating on said flange, and said spring being mounted in said recess of said holder so that said coil of larger diameter is under radial compression.

11. A sealing device according to claim 1 wherein the rear portion of said holder is formed with a recess and wherein there is snugly accommodated in said recess a cup of substantially rigid material having an opening in the bottom part thereof.

12. A sealing device according to claim 11 wherein a compression spring is mounted in said cup with one end seating on the bottom part of the cup around the opening therein and the other end bearing on the rear of said inner rim of said diaphragm portion of said holder.

13. A sealing device according to claim 1 wherein the rear portion of said holder is formed with a recess, and comprising a cup of substantially rigid material snugly accommodated in said recess and having an opening in the bottom part thereof, and a compression spring of cylindrical form with one end seating on the bottom part of said cup and the other end bearing on the rear of said inner rim of said diaphragm portion of said holder.

14. A sealing device according to claim 1 wherein the rear portion of said holder is formed with a recess, and comprising a cup of substantially rigid material snugly accommodated in said recess and having an opening in the bottom part thereof, and a compression spring of cylindrical form with one end seating on the bottom part of said cup and the other end bearing on the rear of said inner rim of said diaphragm portion of said holder, the rear of said inner rim being recessed to receive said other end of said compression spring.

References Cited in the file of this patent

UNITED STATES PATENTS

| 2,027,505 | Winkler | Jan. 14, 1936 |
| 2,233,624 | Magnesen | Mar. 4, 1941 |
| 2,338,873 | Reynolds | Jan. 11, 1944 |
| 2,365,065 | Frankenfield | Dec. 12, 1944 |
| 2,575,818 | Kosatka | Nov. 20, 1951 |

FOREIGN PATENTS

| 963,942 | France | Jan. 18, 1950 |